US006518539B2

(12) United States Patent
Hackel et al.

(10) Patent No.: US 6,518,539 B2
(45) Date of Patent: Feb. 11, 2003

(54) METHOD FOR PRODUCING DAMAGE RESISTANT OPTICS

(75) Inventors: Lloyd A. Hackel, Livermore, CA (US); Alan K. Burnham, Livermore, CA (US); Bernardino M. Penetrante, San Ramon, CA (US); Raymond M. Brusasco, Livermore, CA (US); Paul J. Wegner, Livermore, CA (US); Lawrence W. Hrubesh, Pleasanton, CA (US); Mark R. Kozlowski, Windsor, CA (US); Michael D. Feit, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/948,444

(22) Filed: Sep. 7, 2001

(65) Prior Publication Data

US 2002/0046998 A1 Apr. 25, 2002

Related U.S. Application Data

(60) Provisional application No. 60/242,496, filed on Oct. 23, 2000.

(51) Int. Cl.$^7$ ................................................ B23K 26/00
(52) U.S. Cl. ................................ 219/121.6; 219/121.83
(58) Field of Search ........................ 219/121.6, 121.65, 219/121.66, 121.67, 121.68, 121.69, 121.83, 121.85

(56) References Cited

U.S. PATENT DOCUMENTS

| 3,999,865 | A | | 12/1976 | Milam et al. ................ 356/239 |
| 4,667,101 | A | | 5/1987 | Siekhaus .................... 250/307 |
| 5,472,748 | A | | 12/1995 | Wolfe et al. ................ 427/554 |
| 5,680,412 | A | * | 10/1997 | De Marta et al. |
| 5,796,523 | A | | 8/1998 | Hall .......................... 359/629 |
| 6,099,389 | A | | 8/2000 | Nichols et al. ............... 451/36 |
| 6,191,385 | B1 | * | 2/2001 | O Loughlin et al. |

* cited by examiner

Primary Examiner—Samuel M. Heinrich
(74) Attorney, Agent, or Firm—Eddie E. Scott; Alan H. Thompson

(57) ABSTRACT

The present invention provides a system that mitigates the growth of surface damage in an optic. Damage to the optic is minimally initiated. In an embodiment of the invention, damage sites in the optic are initiated, located, and then treated to stop the growth of the damage sites. The step of initiating damage sites in the optic includes a scan of the optic using a laser to initiate defects. The exact positions of the initiated sites are identified. A mitigation process is performed that locally or globally removes the cause of subsequent growth of the damaged sites.

33 Claims, 10 Drawing Sheets

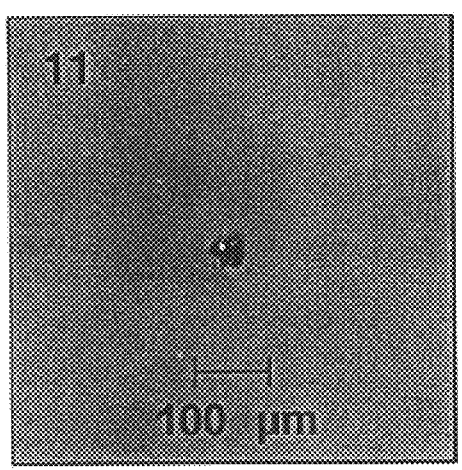
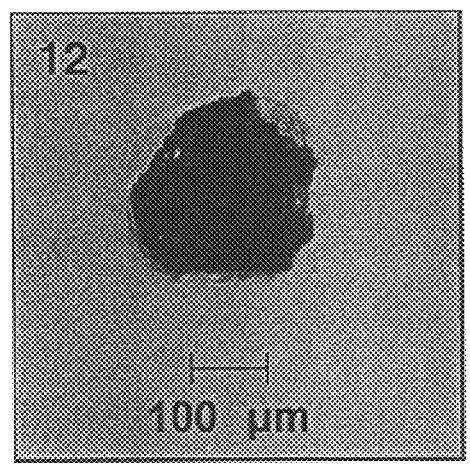
FIG. 1A  FIG. 1B
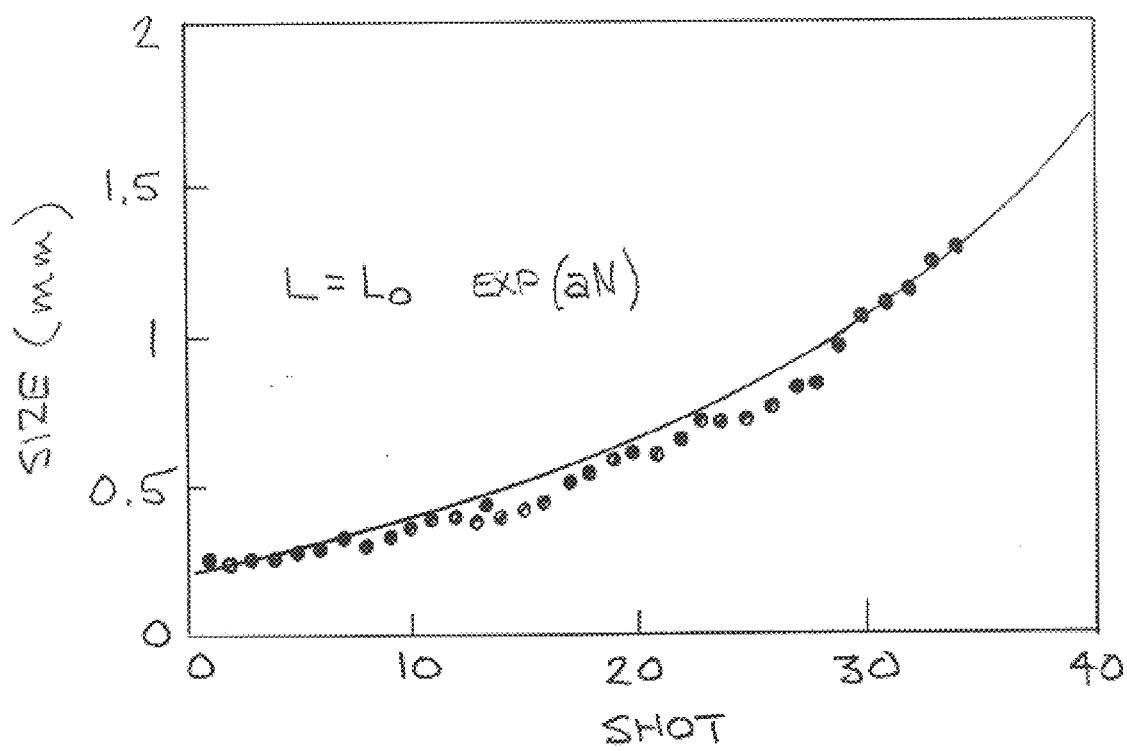
FIG. 2

METHOD FOR PRODUCING DAMAGE RESISTANT OPTICS

CROSS-REFERENCE TO RELATED APPLICATIONS

This application claims the benefit of U.S. Provisional Application No. 60/242,496, filed Oct. 23, 2000, and entitled "CO2 Laser and Plasma Microjet Process for Improving Laser Optics," which is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of Endeavor

The present invention relates to optics and more particularly to a system that mitigates the growth of surface damage in an optic.

2. State of Technology

U.S. Pat. No. 4,667,101 for predicting threshold and location of laser damage on optical surfaces by Wigbert Siekhaus, patented May 19, 1987 provides the following description, "Modern day applications of laser devices call for increasingly powerful and precise beams. Such applications require high resolution optical devices such as lenses, filters, and mirrors. The application of large intensities of laser energy to these devices frequently destroys them during operation. Often the level of intensity required for experimental applications (such as the Projects Nova and Novette at the Lawrence Livermore National Laboratory) is so high that pretesting of the optical device at the required intensities would be impractical. The level of effort required to prepare for and execute the desired experiments, however, is very high and so an effective means of pretesting such devices is desirable. Presently there are no commercially available devices capable of "stress testing" a particular optical device. U.S. Pat. No. 3,999,865, issued Dec. 28, 1976 to Milam, et al, teaches an instrument capable of analyzing the cause of damage to optical devices. It provides for subjecting the device to a damaging energy and intensity and then analyzing the damage from the standpoint of time and applied power in order to determine the one or more of several reasons for the laser induced damage. While Milam is helpful in improving system design or production techniques, it requires that damage actually occur and only indirectly identifies flaws through analysis of the parameters of the damaging event. The tested device clearly can no longer be used."

U.S. Pat. No. 5,796,523 for a laser damage control for optical assembly by John M. Hall, patented Aug. 18, 1998 provides the following description, "Protection methods and apparatus for optical equipment have been attempted for providing protection from laser energy that could otherwise damage optical radiation detectors, including the human eye. The most common technique of providing protection involves optical filtering elements, which offer substantial protection but only over a limited, fixed spectral color range. Standard dielectric coatings are the most common form of filters, and flat plates with these "notch" coatings can be easily inserted into or outside many common optical assemblies. As noted above, however, these filters are useful only over a limited range of wavelengths, and also have the added disadvantage of blocking even non-harmful radiation within the designed spectral region. Typical military magnifying optical assemblies such as telescopes, periscopes, and binoculars vary widely, and typically have magnifying powers ranging from 4×to 10×, with entrance aperture diameters going from 20 mm to 60 mm or more. As the magnifying power increases, the angular resolution increases, and thus the farther away a given target can be recognized. The larger apertures are required to gather sufficient light energy to allow good contrast for far-away targets. These magnifying optical systems are commonly designed for use with the human eye, but can also easily perform similar tasks when connected to standard television camera equipment. Given the harsh nature of military environments, these optical systems do not lend themselves easily to the use of attachments to perform laser protection functions. All magnifying optical assemblies of the kind found in telescopes, periscopes, and binoculars can be characterized as consisting of an objective lens set, followed by an eyepiece assembly, with either a real or virtual focal plane between, as well as a variety of intervening prism assemblies (almost always porro prisms) to keep the image orientation proper. The magnifying power is defined as the ratio of the objective focal length divided by the eyepiece focal length. Typical fields of view for these systems range from 2°to 10°, depending upon the magnification. In the prior art for all these systems, the focal planes between the objective and eyepiece sections, or between any intervening relay optics, is not well corrected for aberrations. This does not affect the overall system performance, because the aberrations of the objective can be compensated by those of the eyepiece. It is much more difficult to design both objective and eyepiece optics to each have diffraction limited focal planes, and therefore this feature is not normally embraced by the current art. Additionally, since the magnifying power is the ratio of the objective and eyepiece focal lengths, it is desirable to have a relatively short focal length eyepiece to minimize the objective focal length for a given magnification. This reduces the overall size of the system, but does not offer much room between the eyepiece assembly and the intermediate focal plane. Because of this, prior art designs do not usually allow elements other than thin transmissive reticle plates to occupy the space in or near the intermediate focal plane. The prior art in developing laser protective devices offers many techniques, including sacrificial mirrors, transmissive optical power limiters, liquid cells, etc. These devices are generally designed to operate passively within an optical system until indicent optical radiation is of sufficiently high energy to activate the protective mechanism. In order to set the activation threshold below the damage threshold of the detector (human eye, TV camera, etc.), it is desirable to place the power limiter in or near a well corrected, diffraction limited focal plane. Additionally, the optical system must be able to accommodate the volume of the power limiter device, and be able to provide proper image orientation should the device create an image translation."

U.S. Pat. No. 6,099,389 for fabrication of an optical component by Nichols et al, patented Aug. 8, 2000 provides the following description: "A method for forming optical parts used in laser optical systems such as high energy lasers, high average power lasers, semiconductor capital equipment and medical devices. The optical parts will not damage during the operation of high power lasers in the ultra-violet light range. A blank is first ground using a fixed abrasive grinding method to remove the subsurface damage formed during the fabrication of the blank. The next step grinds and polishes the edges and forms bevels to reduce the amount of fused-glass contaminants in the subsequent steps. A loose abrasive grind removes the subsurface damage formed during the fixed abrasive or "blanchard" removal process. After repolishing the bevels and performing an optional fluoride etch, the surface of the blank is polished using a zirconia slurry. Any subsurface damage formed during the loose abrasive grind will be removed during this zirconia polish. A post polish etch may be performed to remove any redeposited contaminants. Another method uses a ceria polishing step to remove the subsurface damage formed during the loose abrasive grind. However, any residual ceria may interfere with the optical properties of the finished part. Therefore, the ceria and other contaminants are removed by performing either a zirconia polish after the ceria polish or a post ceria polish etch."

U.S. Pat. No. 5,472,748 for permanent laser conditioning of thin film optical materials by Wolfe et al, patented Dec. 5, 1995 provides the following description: "The performance of high peak power lasers, such as those used for fusion research and materials processing, is often limited by the damage threshold of optical components that comprise the laser chain. In particular, optical thin films generally have lower damage thresholds than bulk optical materials, and therefore thin films limit the output performance of these laser systems. Optical thin films are used as high reflectors, polarizers, beam splitters and anti-reflection coatings. The Nova project at Lawrence Livermore National Laboratory is designed to study the use of lasers to produce fusion by inertial confinement. The 1.06 $\mu$m wavelength Nova laser output is limited, in part, by the damage threshold of large aperture (approximately 1 m diameter) dielectric thin films coated on flat substrates. Proposed future fusion lasers require optical coatings with laser induced damage thresholds that exceed a fluence of 35 J/cm2 in 10 ns pulses at the 1.06 $\mu$m wavelength. Fluence is defined in the specification and claims for a pulsed laser of a specified wavelength and specified pulse length as the energy per unit area delivered by a single pulse. Prior to the invention, the highest damage thresholds were in the range from 10–20 J/cm2 in a 10 ns pulse at the 1.06 $\mu$m wavelength. Therefore, a method of increasing the laser damage threshold of dielectric optical thin films (or coatings) is needed."

SUMMARY OF THE INVENTION

The present invention provides a system of mitigating the growth of laser-induced surface damage in an optic. A damage site in the optic is initiated. The position of the initiated damage site is identified. A mitigation process is performed that removes the cause of subsequent growth of the damage site. In one embodiment of the invention the system mitigates the growth of surface damage in an optic exposed to high-power laser having a wavelength of 1060 nm or less. Damage sites in the optic are initiated, located, and then treated to stop growth of the damage sites. Damage to the optic is minimally initiated. The step of initiating a damage site in the optic includes a scan of the optic using a laser to initiate defects. The exact position of the initiated site is identified. A mitigation process is performed that locally or globally removes the cause of subsequent growth of the damaged site. The mitigation process may be performed locally or globally.

In another embodiment of the invention, the mitigation process on a fused silica optic is performed by locally etching each damage site to render it smoother and remove any laser-energy absorbing defects in each damage site. The etching is accomplished using local application of an acid solution or by exposing the damage site to a small-aperture plasma jet containing fluorine atoms. In another embodiment of the invention, the mitigation process on a fused silica optic is performed by globally etching the entire surface of the optic to render all damage sites on the surface of the optic smoother and remove any laser-energy absorbing defects in all of the damage sites. The etching is accomplished by dipping the entire optic in an acid solution or by exposing the entire surface of the optic to a large-aperture plasma jet containing fluorine atoms. In another embodiment of the invention, the mitigation process on a fused silica optic is performed with a CO2 laser to locally soften the material within and in the immediate vicinity of each damage site to anneal out each damage site. In another embodiment of the invention, the mitigation process on a fused silica optic is performed by scanning the entire surface of the optic with a CO2 laser to anneal out all the damage sites. In another embodiment of the invention, the mitigation process on a fused silica, KDP or DKDP optic is performed with a laser having a pulse length less than 10 ns to locally ablate laser-energy absorbing defect in the damage site. In another embodiment of the invention, the mitigation process on a KDP or DKDP optic is performed by passivation of the damage site by local water etching. In another embodiment of the invention, the mitigation process on a KDP or DKDP optic is performed by removing the damage site with a mechanical grinding tool.

Features of specific embodiments of the invention are to reduce of growth of catastrophic damage on the surface of fused silica, potassium dihydrogen phosphate (KDP) and deuterated potassium dihydrogen phosphate (DKDP) optics, such that the optics can survive prolonged exposure to high-power laser beams having a wavelength of about 1060 nm or less. Another feature is to substantially improve the lifetime of optical components made of fused silica, KDP or DKDP, such that these optical components can survive prolonged exposure to high-power laser irradiation at wavelengths of about 1060 or less. Other features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description and by practice of the invention.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

FIG. 1 shows an initial damage site in a fused silica optic and the same damage site after having grown because of repeated exposure to a high power UV laser.

FIG. 2 illustrates the exponential growth of the size of damage as a function of the number of laser shots.

DETAILED DESCRIPTION OF THE INVENTION

Figure 3:
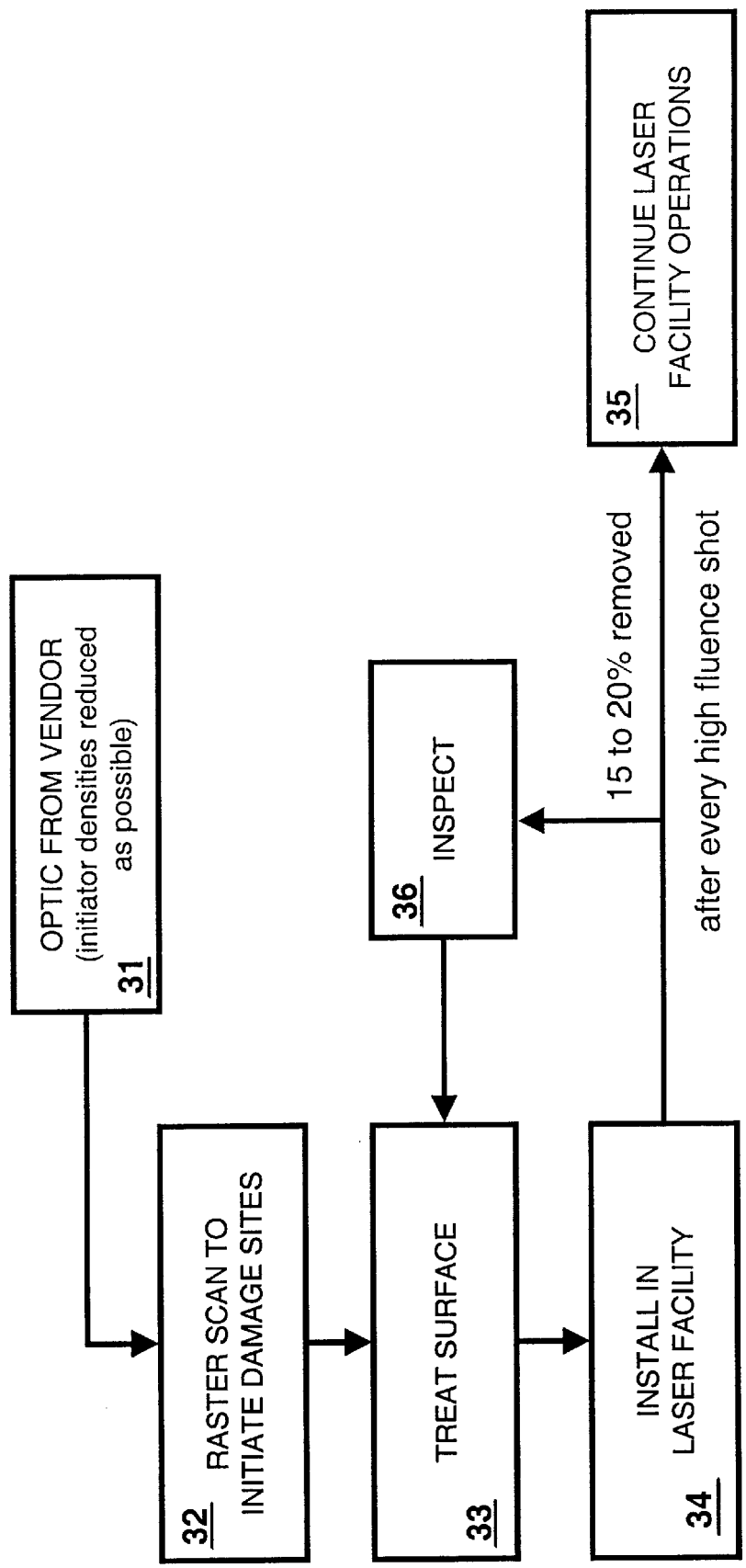
FIG. 3 is a flowchart showing the steps in an embodiment of the invention in which a fraction of the optics is taken off line, inspected and treated after every certain number of laser shots.

Referring now to the drawings, to the following description, and to incorporated information; specific embodiments of the invention are described. The detailed description of the specific embodiments, together with the general description of the invention, serve to explain the principles of the invention.

The present invention provides a system of mitigating the growth of laser-induced surface damage in an optic. A damage site in the optic is initiated. The position of the initiated damage site is identified. A mitigation process is performed that removes the cause of subsequent growth of the damage site. One embodiment of the invention provides a system in which an optic is exposed to a treatment that mitigates the growth of damage when said optic is operated in an environment where they are exposed to high-power lasers having a wavelength of about 1060 nm or less. The wavelength ranges from about 1060 nm down to about 150 nm, such as would be produced, for example, by a YAG first harmonic (1060 nm) laser beam, a YAG second harmonic (530 nm) laser beam, a YAG third harmonic (355 nm) laser beam, a YAG fourth harmonic (250 nm) laser beam, a XeF excimer laser beam (351 and 353 nm), a KrF excimer laser beam (248 nm), a XeCl laser beam (308 nm), and an ArF excimer laser beam (193 nm). High power is defined as the level of power sufficient to initiate damage, or cause the growth of existing damage, on an irradiated optic with a probability of 0.001 percent or greater. For example, if the total number of irradiated laser pulses over a given area of an optic at a certain power is $10^6$ (1 million), then the power is high if 10 of those laser pulses cause damage anywhere over that area. Another example, if it is desired that an optic survive exposure for a total number of $10^6$ laser pulses, then the power is high if the first damage occurs before $10^5$ pulses. Another example, if an optic is being irradiated over an area of 1000 cm$^2$, then the power is high if the area of initiated damage or grown damage on the optic is 0.01 cm$^2$ or larger.

An embodiment of the present invention provides a method of arresting the growth of laser-induced damage on the surface of optics in environments where they are exposed to high-power lasers having a wavelength of about 1060 nm or less, e.g. a YAG first harmonic (1060 nm, oftentimes referred to as 1 $\overline{\omega}$) laser beam, a YAG third harmonic (355 nm, oftentimes referred to as 3 $\overline{\omega}$) laser beam, an excimer laser beam, or some other high-power laser beam such as that intended for the National Ignition Facility. More specifically, the embodiment of the present invention relates to methods for mitigating the growth of surface damage sites that lead to catastrophic failure of the fused silica, KDP or DKDP optics. Further, the embodiment of the present invention relates to significantly increasing the lifetime of finished products, such as lenses and frequency conversion crystals, that are ready for assembly in an apparatus that uses a high-power laser beam having a wavelength of about 1060 nm or less.

Background Information—The sustained performance of high peak power lasers, such as those used for fusion research, is limited by the damage of optical components that comprise the laser chain. The damage initiates in small size, on the order of tens of microns, depending on the peak fluence of the laser. The growth of the damage is exponential in number of shots and can create excessive scatter and beam modulation. Replacing the damaged optics is an option for sustained performance of the laser system, but this option is very expensive. Therefore, a method of reducing or eliminating the catastrophic growth of the damage sites is desirable.

The largest and most powerful lasers designed for achieving thermonuclear ignition will operate with wavelengths ranging from the infrared (1060 nm wavelength) to the ultraviolet (355 nm wavelength). In the final optics stage, the infrared beams will be converted to ultraviolet beams, and then focused to the target. The final optics will be irradiated by a distribution of fluences, peaking at a fluence of about 15 J/cm$^2$, 3 nanosecond pulse duration at 355 nm wavelength. Fluence is defined in the specification and claims for a pulsed laser of a specified wavelength and specified pulse length as the energy per unit area delivered by a single pulse.

Optical components, particularly made of fused silica, are essential for shaping the laser beams and delivering these beams to the target. Optical components, particularly made of deuterated potassium dihydrogen phosphate (DKDP), are essential for converting the laser wavelength from the infrared (1060 nm wavelength) to the ultraviolet (355 nm wavelength). These optics suffer from weakened areas that are prone to damage at the laser fluences contemplated in the aforementioned laser systems. Damage can occur at the fundamental laser wavelength of 1060 nm and, especially, at the tripled wavelength of 355 nm. One option that would enable continued use of the optics is to mitigate the growth of the damage sites before they can create excessive scatter and beam modulation.

Extensive work has been done in laboratories and the optics industry to understand and eliminate damage created by the high peak power of lasers, both internal to the laser optics and externally on the transport optics. In most cases, once a laser optic is damaged, its lifetime is very short with respect to the number of pulses that can be subsequently applied before damage expands to cover a significant portion of the surface.

The initial production of a high-quality fused silica optics involves advanced processing steps including extra deep polishing to multiple depths of the grit at a given grit size, acid etching between polish levels, and use of zirconia as the base polishing material. This process currently produces optics with damage initiation densities on the order of 1 site per cm2 at initiation fluences of 8 to 10 J /cm2 at 3 ns pulse duration and roughly 0.001 damage sites per cm2 for initiation fluences of 4 to 6 J/cm2. This initiator density is quite low relative to the best earlier achieved but even one initiated site on an optic can lead to exponential growth of the damage with subsequent laser shots. This exponential growth can render an optic effectively non-useable in as few as 30 laser shots. A means to stop the growth of damage sites in fused silica optics is critically important for achieving a high power optic system with long lifetime.

Scientific study of the mechanism and manifestations of laser-induced damage on fused silica, KDP and DKDP optics are ongoing. For example, in U.S. Pat. No. 3,999,865, issued Dec. 28, 1976, Milam, et al. describes a system for determining the mechanism responsible for laser-induced damage in a sample which utilizes a procedure of sequentially irradiating a large number of damage sites using a tightly focused laser beam whose intensity is constant in time. A statistical analysis of survival times then yields a determination that damage was due to one of the following mechanisms: 1. linear absorption, 2. nonlinear absorption, 3. absorbing inclusions, 4. mechanical defects, or 5. electron-avalanche breakdown. However, a method for mitigating the growth of existing damage sites is not provided.

Several researchers have reported that the damage thresholds of some optical materials for a particular laser could be increased by first illuminating the optical materials with sub-threshold fluences of the same laser. In U.S. Pat. No. 5,472,748, issued Dec. 5, 1995, Wolfe et al. describe a method for permanently increasing the laser damage threshold of multilayer dielectric coatings by irradiating with a sub-damaging fluence at the operational wavelength of 1060 nm. However, it is not apparent that such a procedure would work for the fused silica or DKDP components particularly at the ultraviolet wavelength of 355 nm. Furthermore, U.S. Pat. No. 5,472,748 does not provide a means for mitigating the growth of surface damage sites.

In U.S. Pat. No. 4,667,101, issued May 19, 1987, Siekhaus describes an apparatus for identifying and locating weak spots that could potentially lead to laser-induced damage by subjecting the material to laser intensities that are less than the intensity actually required to produce the damage, and notes that these weak spots may be eliminated by sustained exposure to the laser beam. Siekhaus also notes the possible use of the apparatus for cleansing the optical surface of impurities that could potentially lead to damage. However, it is not apparent that the apparatus described by Siekhaus in U.S. Pat. No. 4,667,101 will be able to mitigate the growth of surface damage sites when the optic is exposed repeatedly to high-power laser pulses.

Wang et al, 1974, teach that resistance of some optical surfaces and thin films to laser damage at 1060 nm increased when the surfaces were first subjected to subthreshold irradiation. Temple et al., 1979, teach that treatment of fused silica optical surfaces by CO2 lasers can increase their resistance to surface damage by laser light having a wavelength of 1060 nm. Van Stryland et al teach that threshold hardening for bulk damage can be achieved in a variety of materials by repeated irradiation with 270 nm and 380 nm laser pulses. Swain et al., 1982, teach that KDP crystals can be hardened towards bulk laser damage at 1060 nm by subthreshold exposure to 1.06-um laser beams. Increases of 1.5 to 3 times were observed in the bulk laser damage threshold. Atherton et al., 1993, teach that both KDP and DKDP can be hardened to bulk laser damage at 350 nm by subjecting the crystal to a ramped laser fluence the same wavelength. A similar effect was demonstrated by repeatedly rastering the optic with successively higher laser fluence.

None of the above documents provide a means for mitigating the growth of surface damage sites on a fused silica, KDP or DKDP optic when said optic is exposed repeatedly to high-power laser pulses.

FIG. 1 shows an initial damage site 11 in a fused silica optic that was initiated with a high power laser having a wavelength of 351 nm and a fluence of 45 J/cm$^2$. FIG. 1 also shows the same damage site 12 after having grown after 38 laser shots with the same laser at a fluence of 8 J/cm$^2$.

Analogously, crystals made of DKDP are first finished using a machining technology involving diamond tipped cutters. The surface damage initiator density is quite low but even one initiated site on an optic can lead to exponential growth of the damage with subsequent laser shots. A means to stop the growth of damage sites in DKDP optics is just as critically important for achieving a high power optic system with long lifetime.

The conventional way of characterizing laser-induced surface damage is by experimentally determining the lowest damage threshold for a number of small sites. Such a threshold is defined as the level of fluence at which any modification of the optic surface or bulk occurs as a result of the passage of the laser pulse. There are four main types of illumination sequences that are used to determine laser damage thresholds. These are referred to by those skilled in the art as 1-on-1, S-on-1, N-on-1 and R-on-1 damage test types. The 1-on-1 test sequence irradiates a site with only one laser shot. The S-on-1 test sequence irradiates a site with several hundred shots at an equal fluence. The N-on-1 test sequence increments the fluence on a site in s step like manner, with a significant time period between each step. The R-on-1 test slowly increments the fluence, in a ramped manner, on a single site over several hundred shots. Both the S-on-1 and R-on-1 tests are done with only 100 ms between each laser pulse. All previous studies of laser conditioning deal with its effect on the laser damage threshold as measured by one of these four types of illumination sequences. In these tests, the many individual test sites are well separated. A curve of cumulative damage probability versus laser fluence is found from the ratio of the number of sites that damage below a certain fluence to the total number of test sites. A laser beam with a diameter of about 1 mm is typically used. Because each test site is only as big as the laser beam diameter, these tests can be done with small optics samples and are very quick for quickly screening the effectiveness of any process for improving the optic. However, these tests sample only a very small fraction of the area of the optic, and appreciable damage information can be obtained only at fluences much higher than those appropriate for large optics under realistic operating conditions.

Neither a single damage threshold nor even a damage threshold probability curve from off-line tests is directly applicable, especially to the large-aperture case, because damage occurs first at the weakest site on the illuminated area and the testing of a larger area increases the probability of finding a damage site. The preferred procedure for characterizing the laser power handling capability of a large optic is to measure the curve of damage concentration versus fluence. The damage concentration is the ratio of the number of damage sites produced to the area irradiated at a fixed fluence. A relatively much larger area of the optic has to be tested to get an accurate count of the damage concentration at each fluence. Such a large area can be tested by using a laser beam with a large beam diameter, or by raster scanning a small-diameter laser beam over a large area of the optic.

Generally the expected damage density scales as the power of the fluence and requires that the beam shape and fluence distribution be taken into account. The damaging defect density can be used together with a description of damage growth with repeated irradiation to estimate the fraction of an optic obscured by laser damage after a sequence of laser shots. The rate of damage growth is exponential with the number of laser shots and the rate constant is fluence dependent. Thus it becomes fundamentally important to be able to stop the growth of damage as well as to reduce the incidence of damage initiation.

FIG. 2 shows the exponential growth of the size of damage as a function of the number of laser shots at a wavelength of 351 nm and a fluence of 8 J/cm$^2$. The size of the initial damage site was around 0.25 mm. The size of the damage site has grown to 1.25 mm after only 35 laser shots.

Embodiments of the Invention

The useful service lifetime of an optic used for high fluence and high peak power pulsed laser operation is usually determined by the initiation of damage spots that subsequently grow to large size and degrade the transmission of the optic. The present invention provides a system in which an optic is exposed to a treatment that mitigates the growth of damage during use of the optic in high power operation. The present invention provides systems that will arrest damage from growing within an optic.

In an embodiment of the invention steps are taken to mitigate the growth of damage in the optic. In the first step, damage to the optic is minimally initiated by a post-processing scan of the optic using a high-power laser. Next, the exact position of the initiated site is identified. Then a mitigation process is performed that locally or globally removes the cause of subsequent growth of the damaged site.

FIG. 3 shows the flowchart of the steps in an embodiment of the invention in which a fraction of the optics is taken off line, inspected and treated after every certain number of laser shots. The optics are received from the vendor 31 with the damage initiator densities reduced as possible by means of advanced finishing and polishing processes. The optics are then raster scanned 32 with a high-power small-aperture laser to initiate damage sites on any defects left over by the finishing and polishing process. The surface of the optics is treated 33 to mitigate the growth of the damage sites. After the mitigation treatment, the optics are installed in the laser facility that contains the high-power large-aperture laser. Around 15 to 20 percent of the optics are removed after every high fluence shot and inspected for damage 36. If no damage is found, the optics are reinstalled and the laser facility operations continue 35. If damage is found, the surface of the optic is treated 33 to mitigate the growth of the damage site. After the damage mitigation treatment, the optics are reinstalled and the laser facility operations continue 35.

Figure 4:
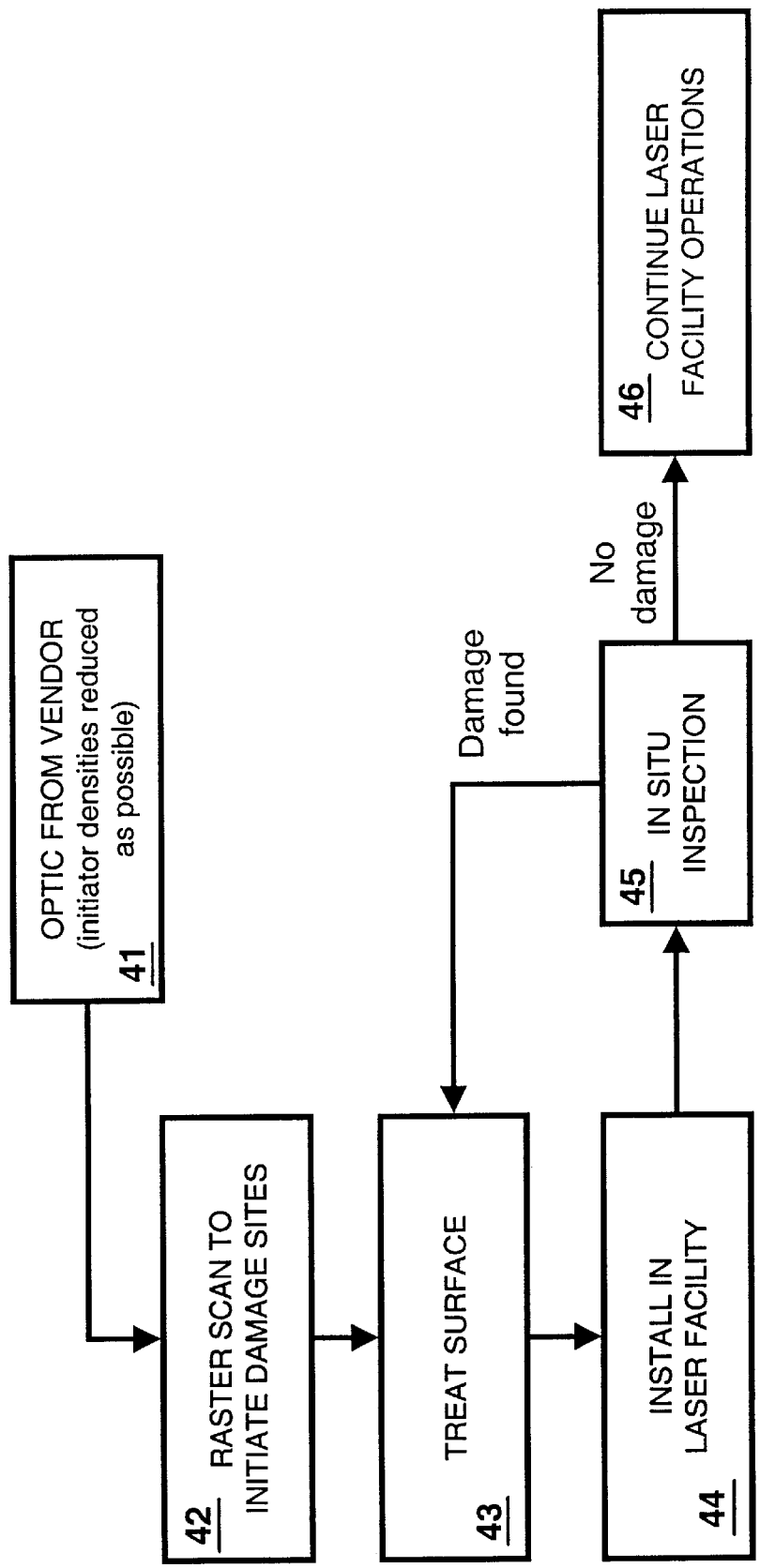
FIG. 4 is a flowchart showing the steps in another embodiment of the invention in which an in situ inspection is performed to look for optics with damage and the optics with damage are then taken off line and treated.

FIG. 4 shows the flowchart of the steps in another embodiment of the invention in which an in situ inspection is performed to look for optics with damage and the optics with damage are then taken off line and treated. The optics are received from the vendor 41 with the damage initiator densities reduced as possible by means of advanced finishing and polishing processes. The optics are then raster scanned 42 with a high-power small-aperture laser to initiate damage sites on any defects left over by the finishing and polishing process. The surface of the optics is treated 43 to mitigate the growth of the damage sites. After the mitigation treatment, the optics are installed in the laser facility 44 that contains the high-power large-aperture laser. An in-situ damage inspection is performed 45 to determine if damage has occurred during the operation of the laser facility. If no damage is found, the laser facility operations continue 46. If damage is found, the optic is taken off line and the surface of the optic is treated 43 to mitigate the growth of the damage site. After the damage mitigation treatment, the optics are reinstalled and the laser facility operations continue 46.

Figure 5:
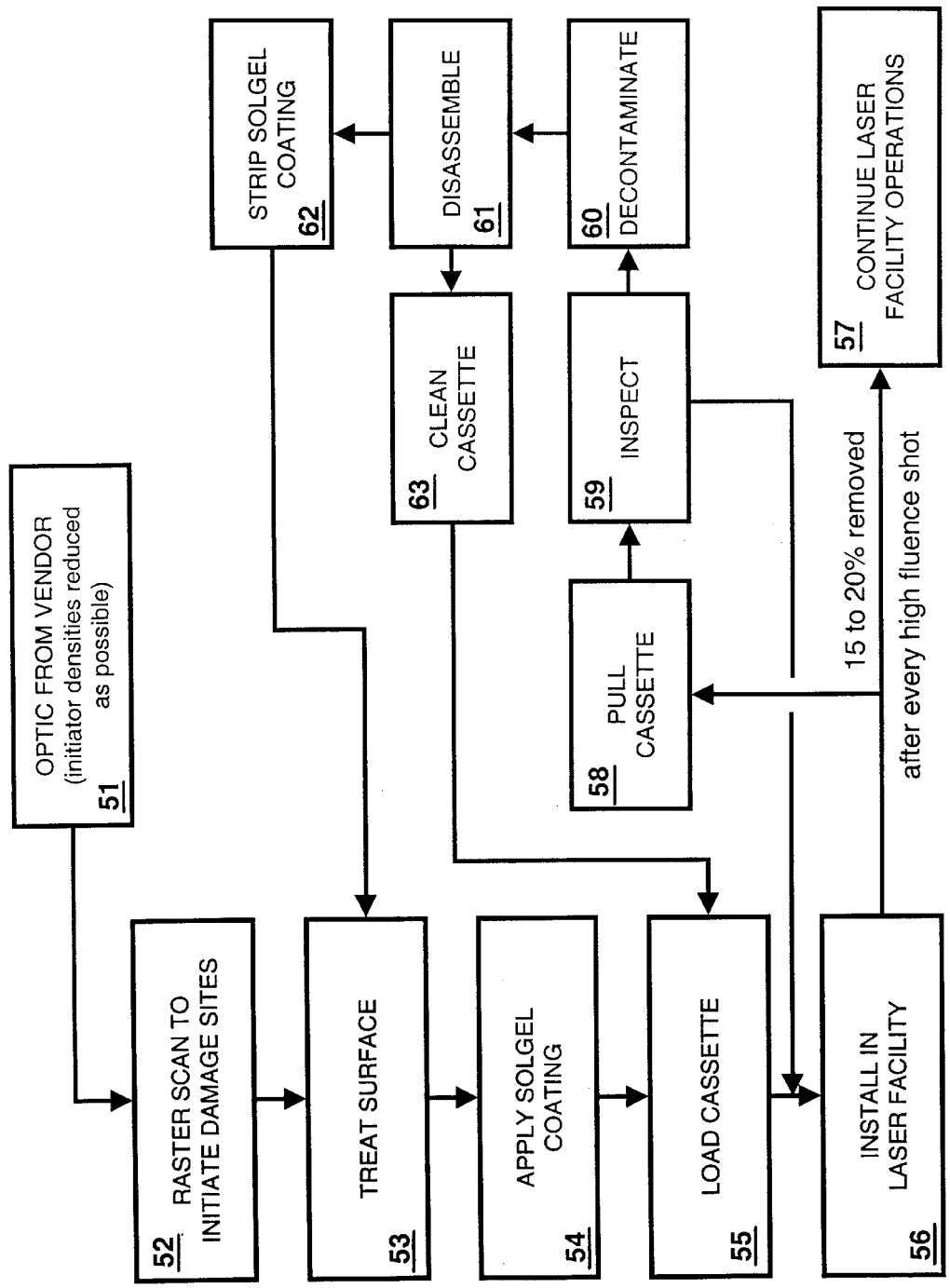
FIG. 5 is a flowchart showing the steps in an embodiment of the invention in which the optics are coated and contained in removable cassettes, and a fraction of the cassettes is taken off line, disassembled, inspected and treated after every certain number of laser shots.

FIG. 5 shows the flowchart of the steps in an embodiment of the invention in which the optics are coated and contained in removable cassettes, and a fraction of the cassettes is taken off line, disassembled, inspected and treated after every certain number of laser shots. The optics are received from the vendor 51 with the damage initiator densities reduced as possible by means of advanced finishing and polishing processes. The optics are then raster scanned 52 with a high-power small-aperture laser to initiate damage sites on any defects left over by the finishing and polishing process. The surface of the optics is treated 53 to mitigate the growth of the damage sites. A solgel coating is then applied to the optics 54. The optics are loaded into a cassette 55 and installed in the laser facility 56. Around 15 to 20 percent of the optics are removed after every high fluence shot by pulling the cassette 58 and the surface of the optics is inspected for damage 59. The cassette and the optics are decontaminated 60 and diassembled 61. The solgel coating of the optics is stripped 62 and the surface is treated for damage growth mitigation 53. The cassette is cleaned 63 and reused for containing the solgel coated optics 55.

Figure 6:
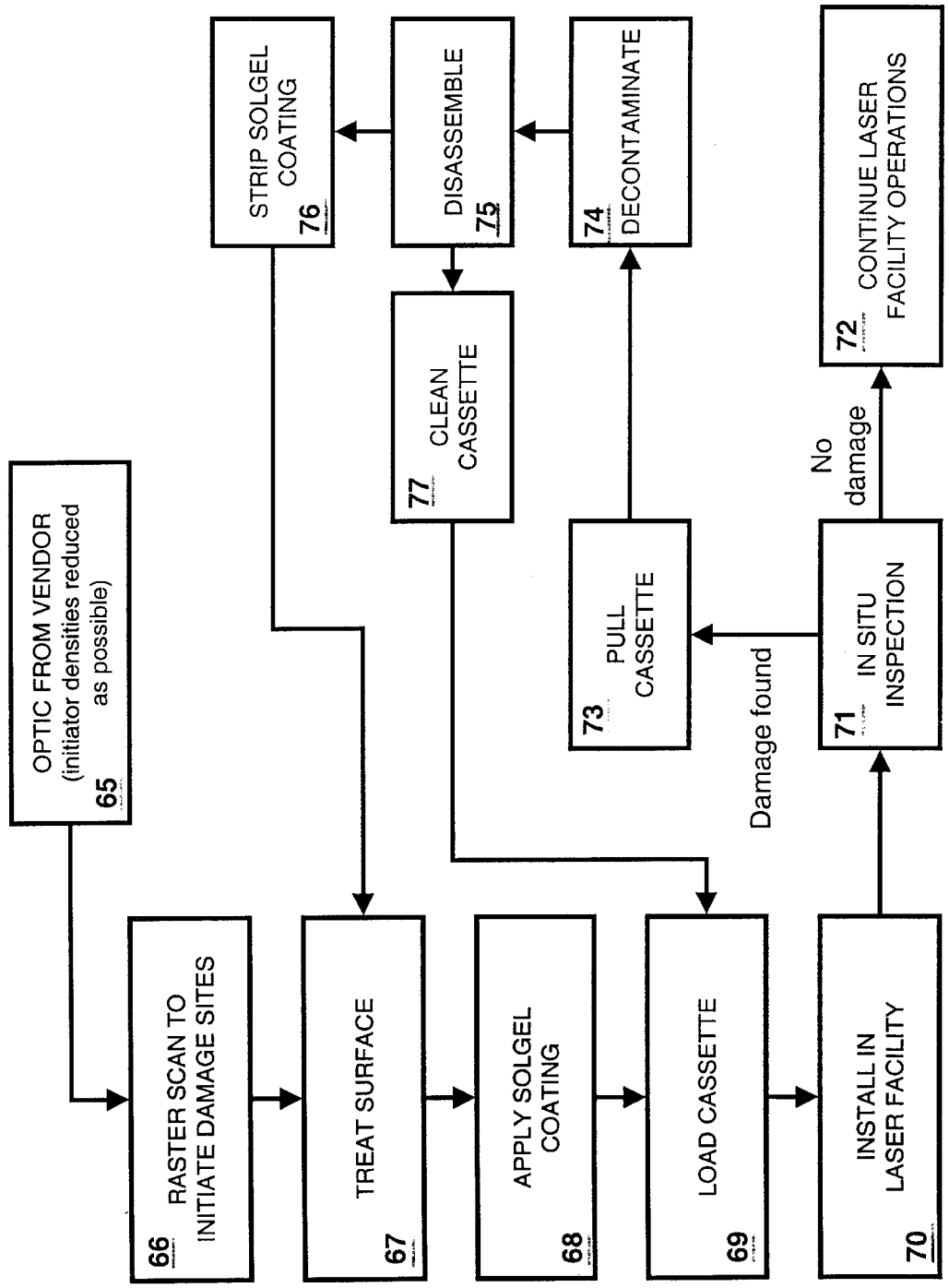
FIG. 6 is a flowchart showing the steps in an embodiment of the invention in which the optics are coated and contained in removable cassettes, and an in situ inspection is performed to look for optics with damage and the cassettes containing optics with damage are then taken off line, disassembled and treated.

FIG. 6 shows the flowchart of the steps in an embodiment of the invention in which the optics are coated and contained in removable cassettes, and an in situ inspection is performed to look for optics with damage and the cassettes containing optics with damage are then taken off line, disassembled and treated. The optics are received from the vendor 65 with the damage initiator densities reduced as possible by means of advanced finishing and polishing processes. The optics are then raster scanned 66 with a high-power small-aperture laser to initiate damage sites on any defects left over by the finishing and polishing process. The surface of the optics is treated 67 to mitigate the growth of the damage sites. A solgel coating is then applied to the optics 68. The optics are loaded into a cassette 69 and installed in the laser facility 70. An in-situ damage inspection is performed 71 to determine if damage has occurred during the operation of the laser facility. If damage has occurred, the cassette is pulled 73. The cassette and the optics are decontaminated 74 and diassembled 75. The solgel coating of the optics is stripped 76 and the surface is treated for damage growth mitigation 67. The cassette is cleaned 77 and reused for containing the solgel coated optics 69.

An embodiment of the invention will now be described. The first step is to initiate damage on the optic. The initiation step is accomplished by a laser such as a Nd:glass laser or a UV excimer laser; for example a glass laser can be comprised of a low power Nd:YLF oscillator followed by a zig-zag slab multipass amplifier with phase conjugation and a set of crystals to convert the infrared output to UV. The time for the post-processing scan depends on the size of the optic and the average power of the initiating laser. The optic to be treated is mounted in an x-y translation stage and the laser light is spatially formatted to an optimal shape with fluence to match or slightly exceed that required for eventual operation of the optic in use. The optimal shape depends on the size and type of optic. It is the same size and shape as the optic when enough power is available, and it is square for a simple pulsed raster scanning of an optic. For optics requiring a gradual increase in fluence, a rectangular beam with a ramped fluence from the edge to middle is best.

Figure 7:
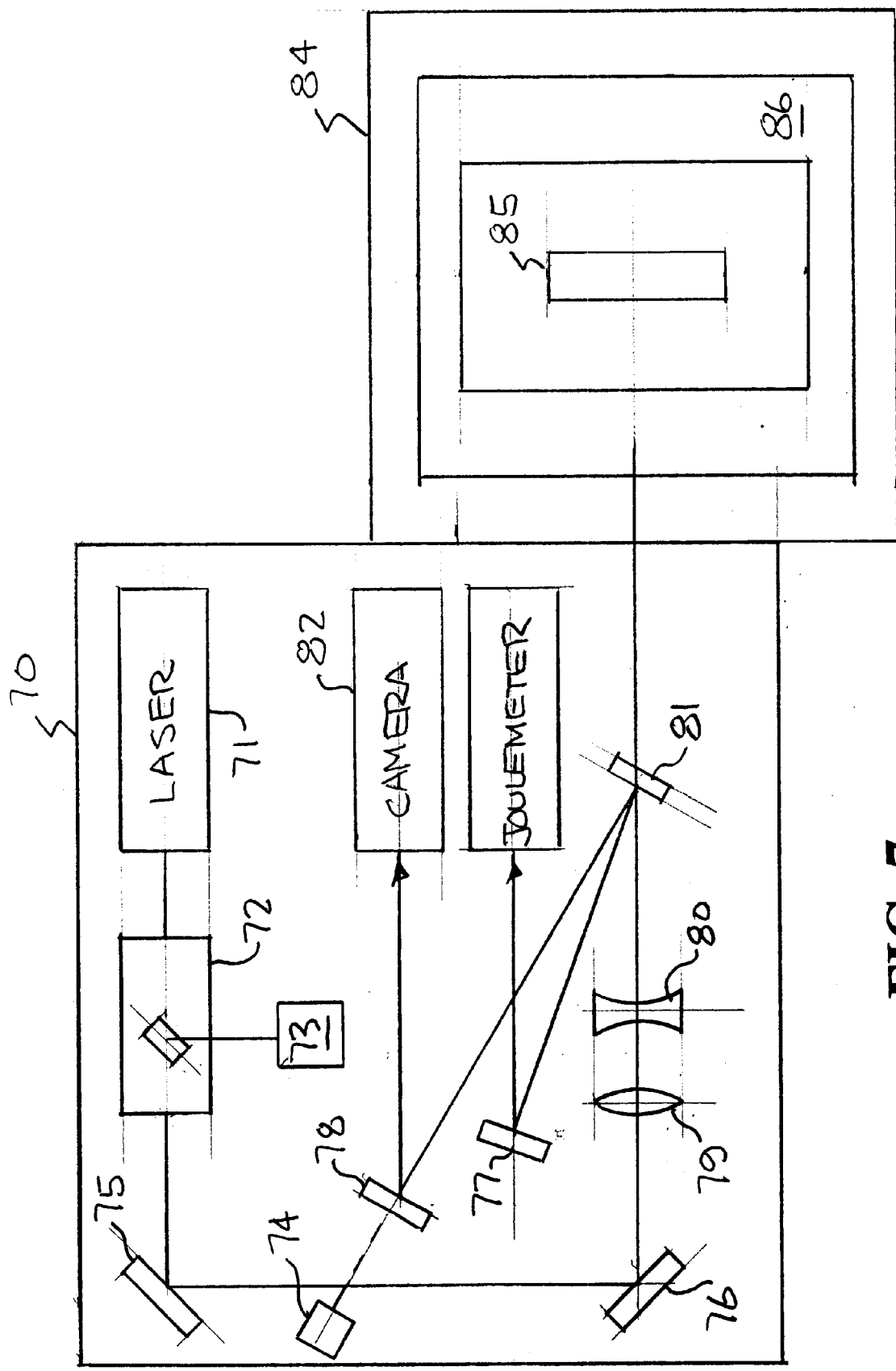
FIG. 7 is an illustration of an apparatus used for initiation of damage sites on a large-aperture optic by rastering with a small beam laser.

FIG. 7 is an illustration of an apparatus used for initiation of damage sites on a large-aperture optic by rastering with a small beam. The apparatus in general is designated by the reference numeral 70. The laser 71 used for both the conditioning and the damage initiation is a tripled Nd:YAG operating at a wavelength of 355 nm and a 10 Hz rep-rate. A variable attenuator 72 allows the laser energy to change from nearly zero up to the maximum available, the unwanted laser energy being directed to a beam dump 73. The beam is transported by a series of mirrors 75, 76 and then is focused by focusing optics 79, 80 down to a 0.7–0.8 mm, 50% FWHM beam diameter. Laser fluence is measured by directing a fraction of the beam using a sampling wedge 81 and a series of mirrors 77, 78 in an equivalent sample plane to a beam profiler with CCD camera 82 and a joulemeter. The optic is placed on a translational stage 86, capable of moving a meter-scale optic weighing up to 400 pounds. The entire translation stage and damage detection system is covered by a class 100 cleanroom 84. The optic is monitored for damage using one of the methods discussed in the next paragraph.

The second step in is to look for the damage sites on the optic. The surface of the optic is scanned by pulsing the laser and sequentially moving the optic. Initiation of damage is detected by observing a plasma flash on the surface with a CCD camera, or by detecting an acoustic response that propagates in the bulk of the optic, or by detecting light scattering from either a co-linear laser beam or a bright side illumination. The acoustic wave is characteristic of initiation damage as contrasted to the plasma flash and acoustic signature of a dust particle on the surface that does not result in initiated damage. The system may have a feedback loop that temporarily shuts off the laser beam upon detection of surface damage in order that the surface damage does not grow to an unacceptable size.

Figure 8A:
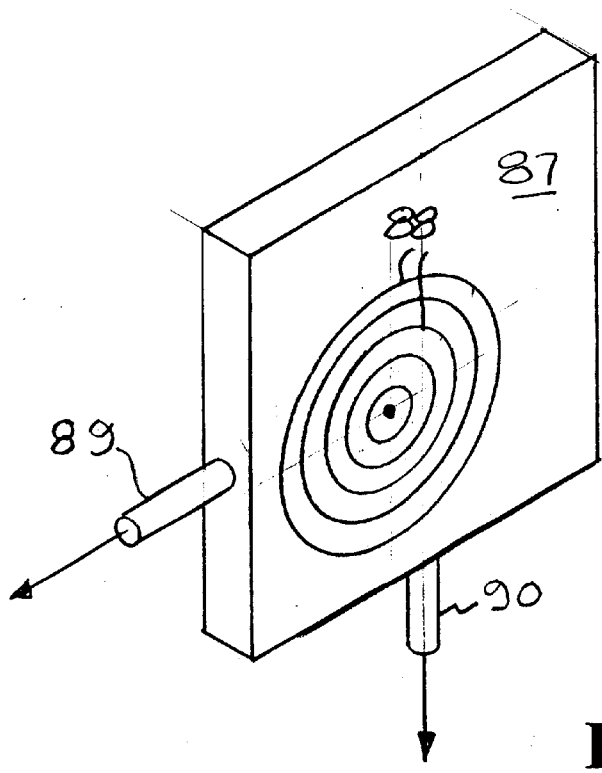
FIG. 8 is an illustration of an apparatus used for detecting the initiation of a damage site by detecting an acoustic response that propagates in the bulk of the optic.
Figure 8B:
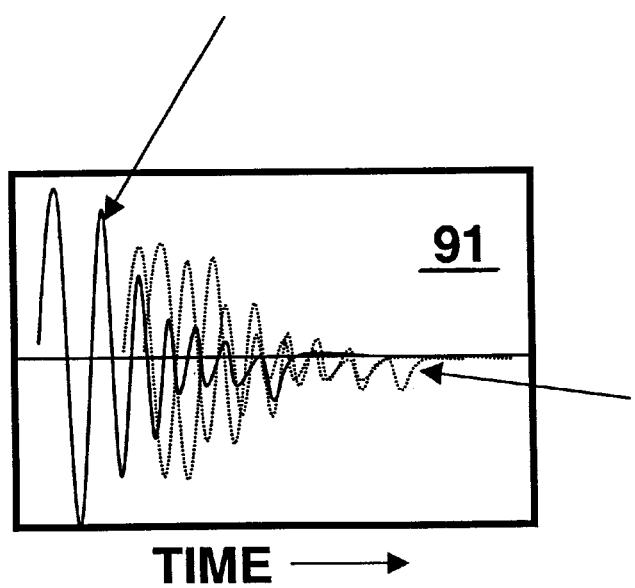

FIG. 8 is an illustration of an apparatus used for detecting the initiation of a damage site by detecting an acoustic response 88 that propagates in the bulk of the optic 87. The x and y components of the acoustic signal are directed to a scope 91 by connections 89, 90.

Figure 9A:
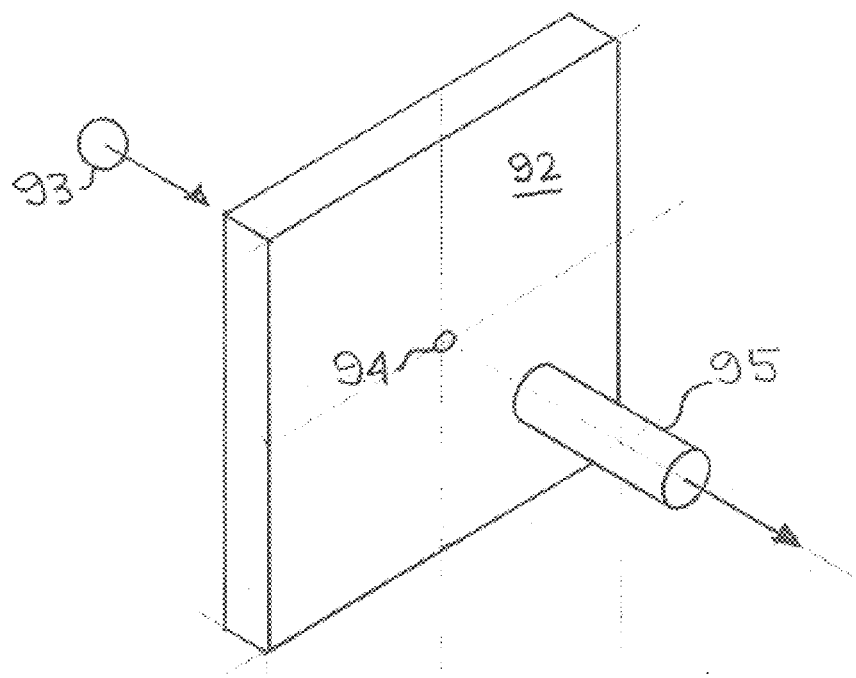
FIG. 9 is an illustration of an apparatus used for detecting the initiation of a damage site by use of a microscope imager with polarization analyzer to detect the local stress birefringence from the damage site.
Figure 9B:
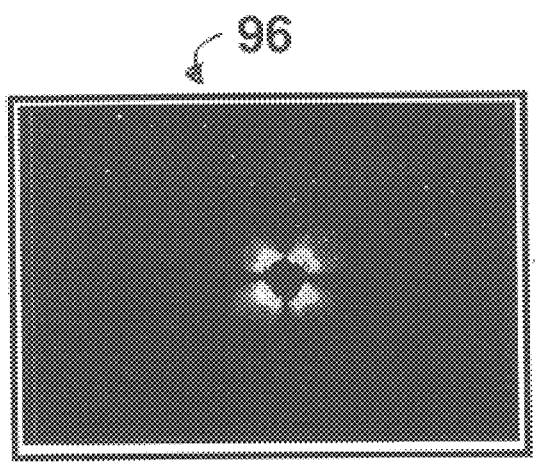

FIG. 9 is an illustration of an apparatus used for detecting the initiation of a damage site by use of a microscope imager with polarization analyzer to detect the local stress birefringence from the damage site. The optic 92 is illuminated from behind by polarized light source 93. The damage site 94 is detected by a microscope imager 95 with a polarization analyzer. Any damage site is detected by the presence of local stress birefringence 96.

The third step is to treat the damage sites on the optic to mitigate the growth of the damage. A mitigation process is performed that locally or globally removes the cause of subsequent growth of the damaged site. There are various ways of mitigating the growth of the damage sites in fused silica, KDP and DKDP optics.

Etching Treatment

One embodiment of the invention includes the use of a cold plasma jet or a local acid etch to treat the locally damaged areas in fused silica optics. An acid etch or a plasma etch can be used to remove material from the initiated damage site. Once treated the optics are again checked with the treatment laser to verify that no sites show damage initiation or growth. This method can also be used to treat an optic that experiences damage initiation during use. In treating an optic that experiences damage initiation during use, the optic is pulled from use, mitigation is treated and the qualification test is performed prior to reuse. Identified defects are passivated by an acid etching or plasma etching treatment.

Figures 10A, 10B, 10C:
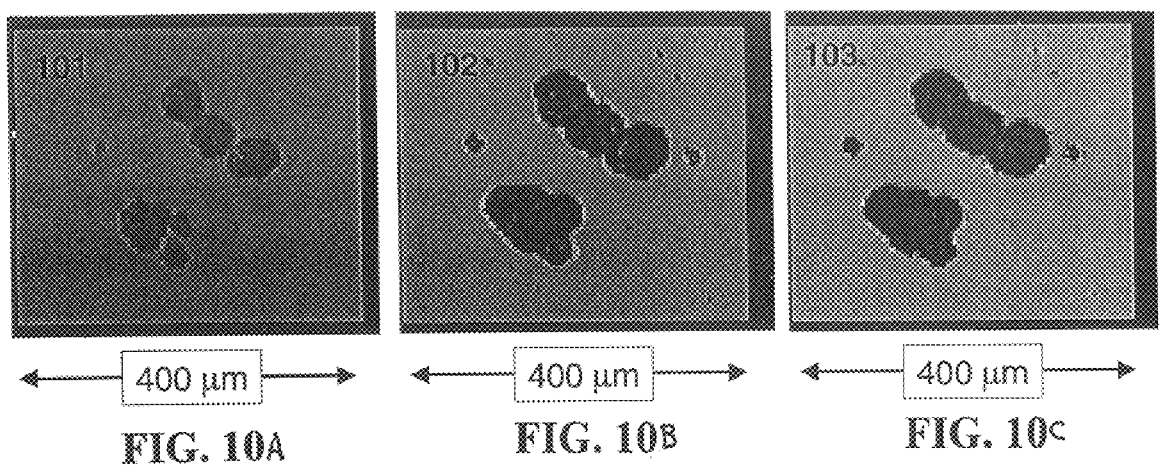
FIG. 10 shows a damage site on a fused silica optic before and after acid etching, and demonstration of mitigated damage growth after exposure to 1000 laser shots at a fluence of 8.5 J/cm$^2$ at a wavelength of 351 nm.

FIG. 10 shows a damage site on a fused silica optic before 101 and after acid etching 102, and demonstration of mitigated damage growth 103 after exposure to 1000 laser shots at a fluence of 8.5 J/cm$^2$ at a wavelength of 351 nm.

In an analogous way, KDP and DKDP crystals can be treated by using local water etching or mechanical grinding to remove material from the initiated damage sites.

$CO_2$ Laser Treatment

Another embodiment of the invention involves local illumination of the damage site in fused silica with a $CO_2$ laser to locally soften the material and anneal out the residual damage. In one embodiment, the mitigation step involves use of a continuous wave $CO_2$ laser set to a power density and duration to thermally soften the fused silica but minimize vaporization of material and thermally induced stress. The $CO_2$ laser can treat just the small damage spot itself or the entire optical surface. It is found that this process removes the damage growth characteristics of the site and leaves the site highly resistant to subsequent growth of the damage.

Figures 11A, 11B, 11C:
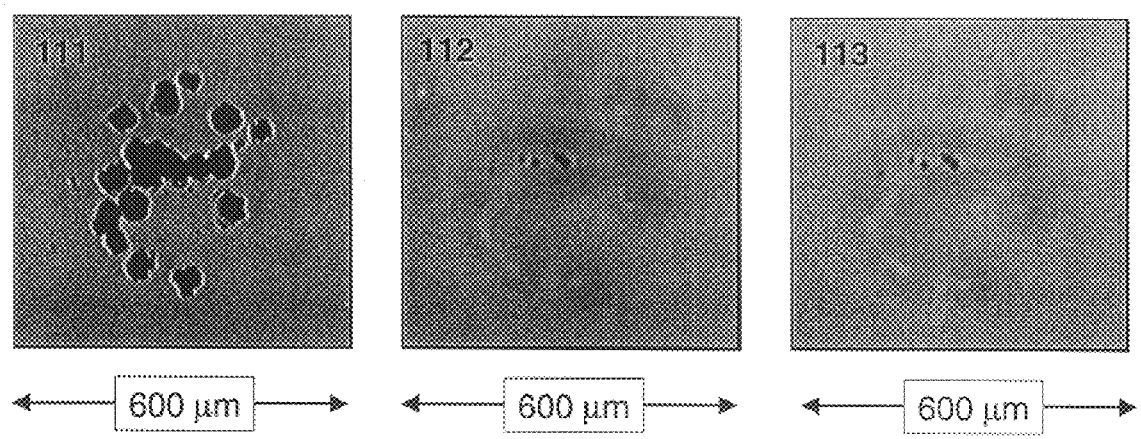
FIG. 11 shows a damage site on a fused silica optic before and after CO2 laser melting, and demonstration of mitigated damage growth after exposure to 1000 laser shots at a fluence of 12 J/cm$^2$ at a wavelength of 351 nm.

FIG. 11 shows a damage site on a fused silica optic before 111 and after $CO_2$ laser melting 112, and demonstration of mitigated damage growth 113 after exposure to 1000 laser shots at a fluence of 12 J/cm$^2$ at a wavelength of 351 nm.

Short-Pulse Laser Ablation Treatment

In another embodiment of the invention, the mitigation process on a fused silica, KDP or DKDP optic is performed with a laser having a pulse length less than 10 ns to locally ablate laser-energy absorbing defect in the damage site.

$CO_2$ Laser Treatment Combined with Finishing

In the case of unacceptable levels of damage or optical distortion by post-finishing mitigation treatment, the optic is returned for the last few finishing steps. The optic is ground and an initiation scan is completed. For example, the entire surface is then treated by $CO_2$ laser surface mitigation. The optic is returned to the manufacturing process and subsequent polishing steps are used to produce the desired surface figure and finish. It is also possible to use $CO_2$ laser surface mitigation of the entire optical surface instead of the $CO_2$ laser surface mitigation of only the damaged area.

Etching Combined with Finishing

In a similar embodiment, acid etch or plasma etch the entire optic to a depth suitable to stop the damage growth and then to do a fine polish to re-achieve the optic's desired surface finish. The mitigation process should remove only a minimal amount of material so that the phase perturbation introduced by the removal of the glass does not, in subsequent use in the laser, refract a sufficient amount of laser light into a beam hot spot and subsequent new damage to the optic. Once mitigation is completed a subsequent scan with the high power laser is used to ensure that all potential damage spots have been initiated and potential growth stopped. The optic is then ready for use.

Damage Growth Mitigation as Part of Optic Manufacturing

Another embodiment of the invention comprises performing the mitigation as part of the optic manufacturing process. The mitigation is done during manufacturing between one of the process steps. For example, cracks induced during the grinding of the optic may prove to be the dominant initiation source. Mitigation by thermal annealing is done between the grinding and subsequent finishing steps of the manufacturing. As in all processes by this method, a finished optic would be scanned by an initiation laser system followed by local mitigation treatment and the quality assurance scan.

System Implementation

It is anticipated that the damage mitigation would be completed in an integrated processing system. The system would include an initiation stage including a laser, a scanning system and a detection system to initiate and identify the position of each potential damage site within the optic. The mitigation system can be either built into the initiating stage or built as a subsequent processing stage. Following the mitigation, the optic is again processed through an initiation stage to verify that all initiated sites have been passivated and that all potential damage sites have been initiated. Once an optic can successfully pass the three stages, it is ready for use. When in use, optics can be routinely inspected for damage and if found, brought back to the damage mitigation system for processing. Using this technique, optics can be made to achieve long high quality operational lifetimes.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A method of mitigating the growth of laser-induced surface damage in an optic, comprising the steps of:
   initiating a damage site in the optic,
   identifying the position of said initiated damage site,
   performing a mitigation process that removes the cause of subsequent growth of said damage site.

2. The method of claim 1 wherein said step of performing a mitigation process that removes the cause of subsequent growth of said damage site, is performed locally.

3. The method of claim 1 wherein said step of performing a mitigation process that removes the cause of subsequent growth of said damage site, is performed globally.

4. The method of claim 1 wherein said optic is made of fused silica.

5. The method of claim 1 wherein said optic is made of potassium dihydrogen phosphate (KDP) crystal.

6. The method of claim 1 wherein said optic is made of deuterated potassium dihydrogen phosphate (DKDP) crystal.

7. The method of claim 1 wherein said damage is initiated by a Nd:YAG laser, either at its fundamental infrared wavelength near 1060 nm, or frequency doubled by a nonlinear optical material to a wavelength near 530 nm or frequency tripled by a nonlinear optical material to a wavelength near 350 nm.

8. The method of claim 1 wherein said damage is initiated by a UV excimer laser having wavelengths from around 350 nm down to around 150 nm, such as a XeF excimer laser (351 and 353 nm), a KrF excimer laser (248 nm), a XeCl laser (308 nm), and an ArF excimer laser (193 nm).

9. The method of claim 1 wherein said damage is initiated by a laser comprised of a low power Nd:YLF oscillator followed by a zig-zag slab multipass amplifier with phase conjugation and a set of crystals to convert the infrared output to UV.

10. The method of claim 9 wherein said laser has an output power in the range of 100 to 500 Watts.

11. The method of claim 9 wherein said laser provides at least 10 J output at 532 nm wavelength with up to 6 Hz repetition rate.

12. The method of claim 1 wherein said damage site is minimally initiated.

13. The method of claim 1 wherein said step of initiating a damage site in the optic includes a scan of said optic using a laser to initiate defects.

14. The method of claim 13 wherein said scan of the optic using a high power laser to initiate defects is performed with a laser with power just above the desired operating fluence.

15. The method of claim 14 wherein the surface of said optic is scanned by pulsing said laser and sequentially moving said optic.

16. The method of claim 1 wherein the optic to be treated is mounted in an x-y translation stage and laser light is spatially formatted to a square or rectangular shape with fluence to match or slightly exceed that required for eventual operation of said optic.

17. The method of claim 1 wherein initiation of damage is detected by observing a plasma flash on said surface with a CCD camera.

18. The method of claim 1 wherein initiation of damage is detected by measuring an acoustic response that propagates in the bulk of said optic.

19. The method of claim 1 wherein initiation is detected by light scattering from a laser beam.

20. The method of claim 1 wherein initiation is detected by light scattering from bright side illumination.

21. The method of claim 1 wherein initiation is detected by measuring the local stress birefringence from said damage site by use of a microscope imager with polarization analyzer.

22. The method of claim 1 wherein said mitigation process is performed on a fused silica optic with a local $CO_2$ laser treatment to locally soften said material and anneal out said residual damage.

23. The method of claim 22 wherein said $CO_2$ laser is set to a power density and duration to thermally soften said fused silica but minimize vaporization of material and thermally induced stress.

24. The method of claim 1 wherein said mitigation process is performed on a fused silica optic with a global $CO_2$ laser treatment to soften said material on said entire surface of said optic and anneal out all of said residual damage.

25. The method of claim 24 wherein said $CO_2$ laser is set to a power density and duration to thermally soften said fused silica but minimize vaporization of material and thermally induced stress.

26. The method of claim 1 wherein said identified defects in a fused silica optic are removed by local acid etching or local plasma etching treatment to locally remove material in said damage site that causes damage growth.

27. The method of claim 1 wherein said identified defects in a fused silica optic are removed by global acid etching or global plasma etching treatment to remove material from said entire surface of said optic that can cause damage growth on all of said damage sites.

28. The method of claim 1 wherein said identified defects in a KDP or DKDP optic are passivated by local water etching.

29. The method of claim 1 wherein said identified defects in a fused silica, KDP or DKDP optic are ablated with a laser having a pulse-length less than 10 ns.

30. The method of claim 1 wherein said identified defects in a fused silica, KDP or DKDP optic are ablated with a laser having a wavelength shorter than 200 nm.

31. The method of claim 1 wherein said identified defects in a KDP or DKDP optic are removed by a small mechanical grinding tool.

32. The method of claim 1 wherein said step of performing a mitigation process on a fused silica optic comprises acid etch of the entire optic to a depth suitable to stop said damage growth and fine polish said optic to reachieve said optic's desired surface finish.

33. The method of claim 1 wherein said step of performing a mitigation process on a fused silica optic comprises plasma etch of said entire optic to a depth suitable to stop said damage growth and fine polish said optic to reachieve said optic's desired surface finish.

* * * * *